United States Patent
Tims et al.

[11] Patent Number: 6,151,626
[45] Date of Patent: Nov. 21, 2000

[54] INTERACTIVE TELEVISION COMMUNICATION SYSTEM

[75] Inventors: Matthew Edward Tims, London; David Robert Weston, Chinnor; Richard Andrew Kydd, Henton, all of United Kingdom

[73] Assignee: Two Way TV Limited, London, United Kingdom

[21] Appl. No.: 09/019,892

[22] Filed: Feb. 6, 1998

[30] Foreign Application Priority Data

Feb. 7, 1997 [GB] United Kingdom ............ 9702537

[51] Int. Cl.$^7$ ........................................ H04N 7/10
[52] U.S. Cl. ...................... 709/219; 348/10; 348/12
[58] Field of Search .................. 348/3, 7, 12, 13, 348/10, 6; 455/5.1; 463/40, 42, 25; 709/217–219

[56] References Cited

U.S. PATENT DOCUMENTS

| | | |
|---|---|---|
| 4,593,904 | 6/1986 | Graves . |
| 4,893,248 | 1/1990 | Pitts et al. ............................ 705/400 |
| 5,038,022 | 8/1991 | Lucero .................................. 463/25 |
| 5,181,107 | 1/1993 | Rhoades ............................... 348/13 |
| 5,285,272 | 2/1994 | Bradley et al. ........................ 348/6 |
| 5,830,068 | 11/1998 | Brenner et al. ...................... 463/42 |
| 5,973,756 | 10/1999 | Erlin .................................... 348/734 |

FOREIGN PATENT DOCUMENTS

| | | |
|---|---|---|
| 0128555 | 6/1984 | European Pat. Off. . |
| 0595354 | 10/1993 | European Pat. Off. . |
| 0620688 | 10/1994 | European Pat. Off. . |
| 9637996 | 11/1996 | WIPO . |

*Primary Examiner*—Nathan Flynn
*Attorney, Agent, or Firm*—Price and Gess

[57] ABSTRACT

An interactive communication system comprises a central controller; and at least one remote unit connected in use to a display device, the central controller generating signals in accordance with a service function, access to all or part of which is restricted. The signals are supplied to the remote unit(s) for display on the display device. The or each remote unit includes a processor, responsive to signals from the central controller, and selectively connectable to the central controller to transmit information back to the central controller. The or each remote unit further comprises an input device and a control memory connected to the processor, the input device allowing a user to enter information, and the control memory storing access control data. The processor is responsive to the access control data to allow a user to gain access to the restricted part of the service function, and periodically supplies data to the central controller related to said access. The central controller can generate signals which are supplied to the remote unit(s) to modify the access control data. The processor is adapted to modify the access control data in the control memory to allow additional access, independently of the central controller.

26 Claims, 5 Drawing Sheets

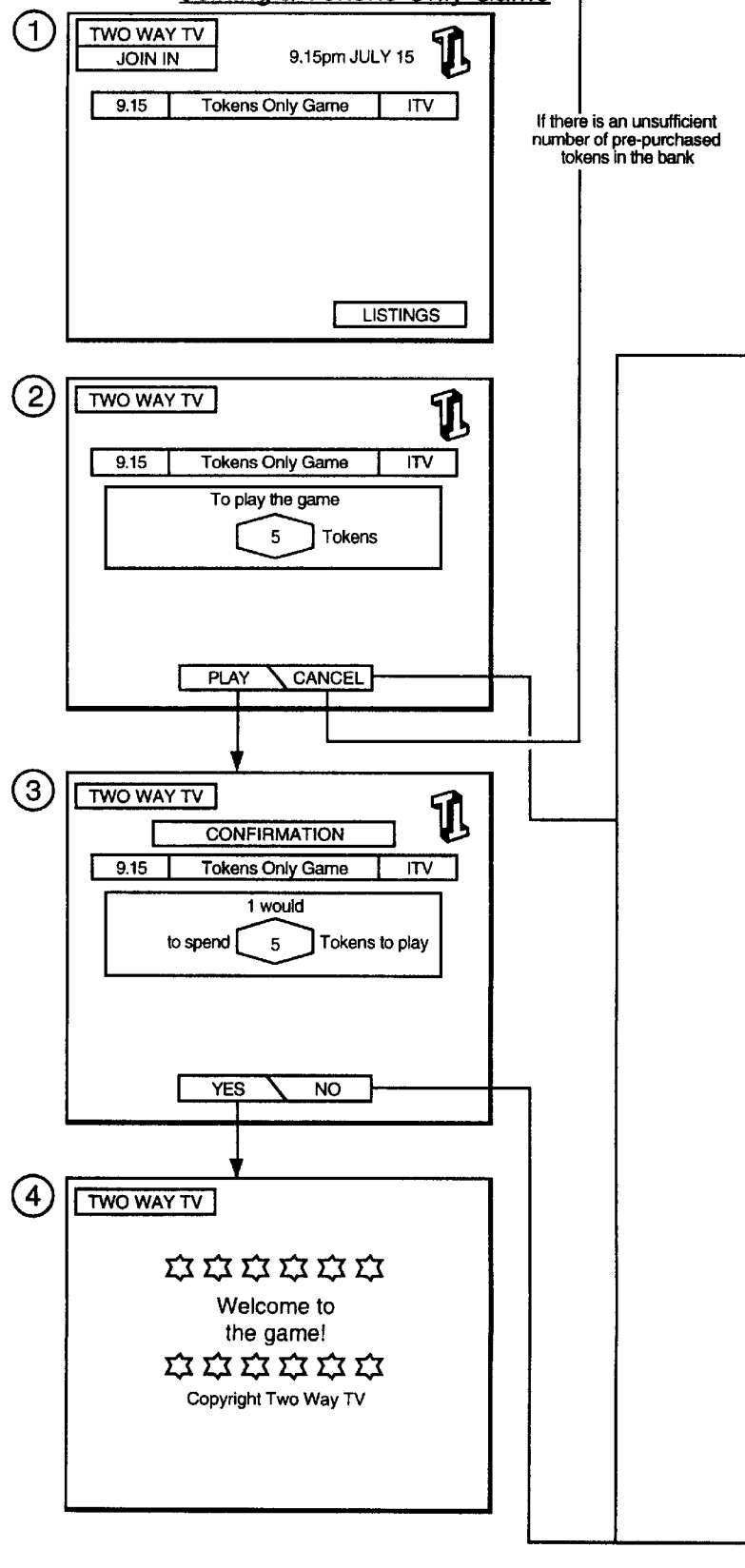

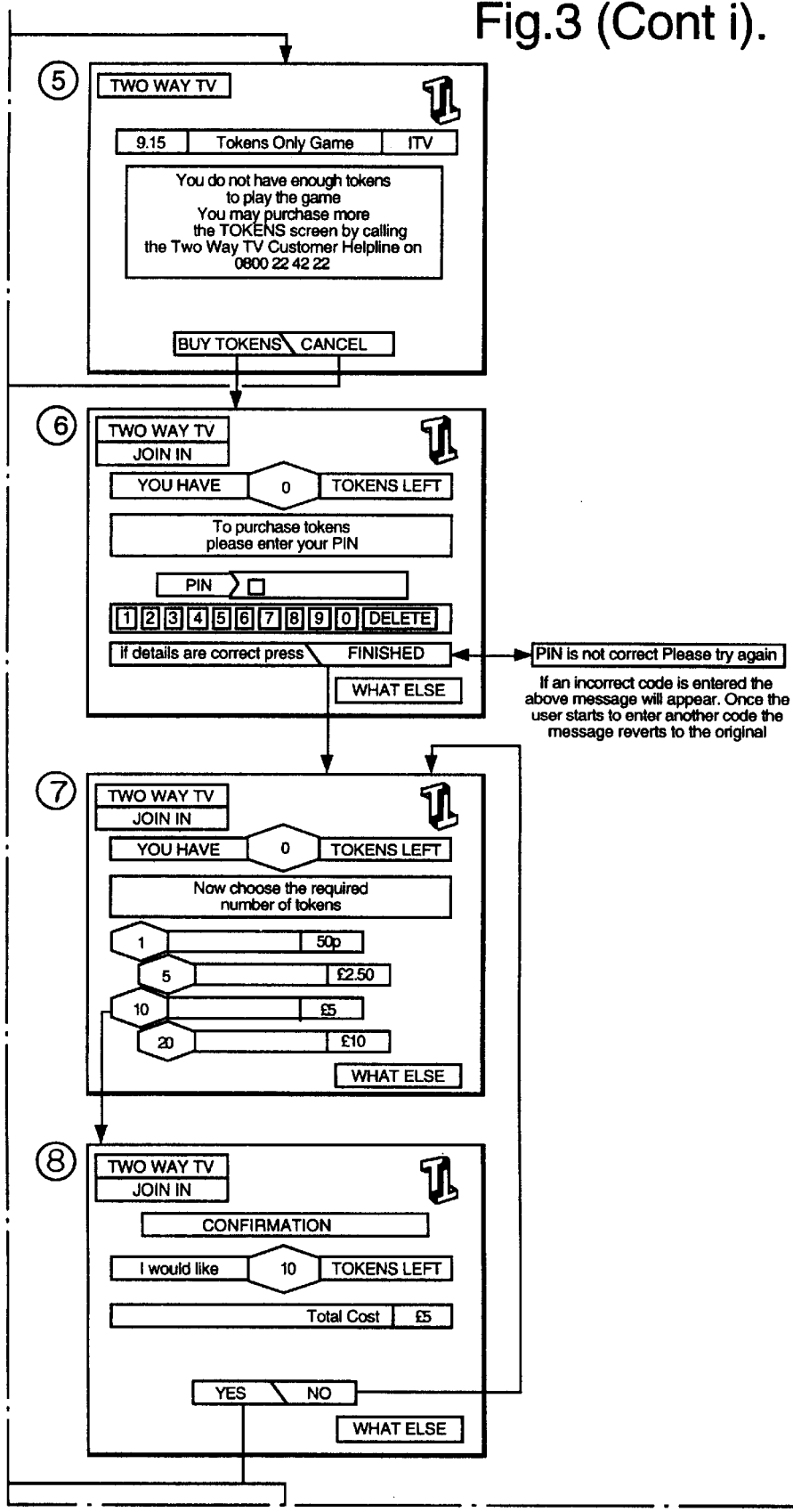
Fig.3 (Cont i).

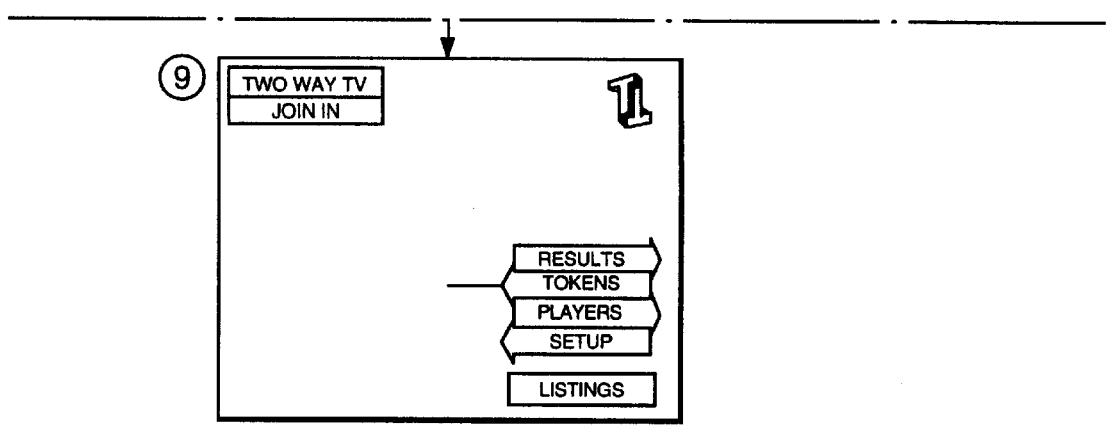
Fig.3 (Cont ii).

INTERACTIVE TELEVISION COMMUNICATION SYSTEM

FIELD OF THE INVENTION

The invention relates to an interactive communication system for use in conjunction with transmitted, display control signals.

DESCRIPTION OF THE PRIOR ART

Interactive communication systems are known in which a central controller is provided which generates signals which are broadcast simultaneously with a TV broadcast to one or more remote units each of which is connected to a local TV receiver and monitor. These systems allow local users or viewers to play games and the like, usually related to a programme being broadcast.

In some cases, there is a need to restrict access to certain games or other service functions provided by the central controller, for example those where a payment is required. EP-A-0128555 describes a prepaid pay-per-view television method and apparatus in which predetermined credit unit amounts are periodically transmitted from a central station to the remote subscriber subsequent to a request from the subscriber and appropriate payment. These credit units are then stored locally and if they are sufficient, a user is allowed to gain access to a restricted access television programme or the like.

EP-A-0595354 describes the use of an IC card holding a prepaid credit which can be inserted into a subscribers remote unit, again to allow access to a restricted access programme.

These known systems have the disadvantage that it is necessary for the subscriber apparatus to obtain credit information from the central station either directly or via a credit card or the like. It also means that if a subscriber has insufficient credits he is unable to gain access to the restricted access programme without purchasing more credit units from the central station or other credit unit supplier which will involve time and therefore the risk of missing the programme.

SUMMARY OF THE INVENTION

In accordance with one aspect of the present invention, an interactive communication system comprises a central controller; and at least one remote unit connected in use to a display device, the central controller generating signals in accordance with a service function, access to all or part of which is restricted, the signals being supplied to the remote unit(s) for display on the display device, wherein the or each remote unit includes a processor, responsive to signals from the central controller, and being selectively connectable to the central controller to transmit information back to the central controller, the or each remote unit further comprising an input device and a control memory connected to the processor, the input device allowing a user to enter Information, and the control memory storing access control data, the processor being responsive to the access control data to allow a user to gain access to the restricted part of the service function, and periodically supplying data to the central controller related to said access, wherein the central controller can generate signals which are supplied to the remote unit(s) to modify the access control data, and wherein the processor is adapted to modify the access control data in the control memory to allow additional access, independently of the central controller.

In accordance with a second aspect of the present invention, we provide a remote unit for use in an interactive communication system according to the first aspect of the invention, the remote unit being connected in use to a display device and including a processor, responsive to the signals from a central controller defining one or more service functions, access to or all or a part of which is restricted, to generate displays on the display device and being selectively connectable to the central controller to transmit information back to the central controller, the remote unit further comprising an input device and a control memory connected to the processor, the input device allowing a user to enter information, wherein the control memory stores access control data, the processor being responsive to the access control data to allow a user to gain access to the restricted part of the service function, and periodically supplying data to the central controller related to said access and wherein the processor is adapted to modify the access control data in the control memory to allow additional access.

We have realised that in many cases, it is not essential to maintain a minute by minute audit of the access control data. The processor can thus act independently of the central controller. In practice, some relaxation of this control can be allowed which, although it may carry some risk that accesses will not be paid for, has significant benefits in user acceptability. Furthermore, it significantly reduces the number of times which the remote unit must communicate with the central station. This does not have to occur on each occasion that the access control data is modified but can occur periodically. The reduction in communication with the central controller also minimises the likelihood of users being unable to gain access at busy times.

Usually, however, the control memory will contain data defining a limit to which the processor can modify the access control data in the control memory to allow additional access in response to a user request. This enables the system operator to maintain some control over the access control data, for example by setting a local credit limit which cannot be exceeded without reference to the central controller.

Typically the processor is adapted to communicate information to the central controller concerning modifications made by the processor to the access control data to allow additional access, on the next occasion when other data is communicated to the central controller. Typically, the processor is adapted to connect to the central controller to pass information relating to past access to the restricted part of the service function when more than a predetermined amount of such use has occurred. For example, the processor may maintain a count of the number of accesses and when this count exceeds a threshold the information is communicated to the central controller. In other cases, the remote unit processor may pass information to the central controller relating to the access control data whenever contact is made with the central controller for some other reason or on specific request from the central controller or if no contact has been made for a predetermined period.

Typically, the processor is adapted to modify the access control data in response to a request from a user via the input device. Thus, if the user sees that his credit limit is reducing, he can simply input a request to increase his credit limit. Providing the result of the request (i.e. the amount of the increase) satisfies the predetermined conditions, for example the overall credit limit is not exceeded, then the access control data will be incremented accordingly.

In some cases, in addition or alternatively, the processor is adapted to modify the access control data in dependence upon the user's response to signals from the central controller. This option is useful where the service function comprises a game or the like and where a prize can be awarded in the form of additional access control data. In this case, the signals from the central controller may represent the same or a different service function.

The access control data may comprise information defining the service function to which access is to be allowed. In this way, it is possible to allow access to certain service functions but not others. Preferably, however, the central controller provides more than one restricted access service function, the processor being responsive to the access control data to allow access to any one of the service functions.

This is a particularly useful aspect of the invention which should be contrasted with conventional systems in which access control is service function specific.

Typically, the supply of data to the central controller will be via the selectively operable connection although in some cases the processor could cause the data to be stored on a portable medium, such as a smart card, which is then sent to the central controller.

A large variety of service functions with which this invention can be used are envisaged. These include shopping, games which may or may not offer value prizes, betting such as fixed odds bets on horse racing, fantasy teams and the like. Furthermore, the system may be used with service functions which have sections freely available to users and other sections which are restricted. For example, in the case of a skill based game, the ability to win a value prize will be restricted while the ability simply to play the game will be unrestricted. In the case of betting, access to that part of the service function which allows a value bet to be placed may be restricted while pseudo-bets which have no value can be placed by others who do not have access to the restricted part of the service function.

The access control data can take a variety of forms and in a very simple form it could be based on a known approach using a key which, if present, allows the user to gain access but if not present prevents access. In a more sophisticated approach, the access control data is in the form of a record of a number of "tokens" which usually will have been purchased by the user. In one example, the access control data comprises a count defining a number of allowed accesses to the restricted part of the service function. Where the access control data comprises tokens then the count may correspond to a number of tokens with typically one token required per access. In other cases, for particular high value service functions, the count may be decremented more than once when access is allowed.

It will be understood that the various memories described above could be constituted by different sections of a common memory or separate stores.

Typically, the remote unit will communicate with the central controller via a medium different from the medium carrying the display control signals and signals from the central controller, for example via a public switched telephone network, satellite communication or the like.

Preferably, the system is for use in conjunction with transmitted, display control signals, wherein each remote unit is adapted to receive the display control signals and provide a corresponding visual display. The display control signals can be supplied in any known manner. Typically, they will be supplied in the form of a TV broadcast but other forms of delivery such as the Internet could be used. Furthermore, the transmission medium can have any conventional form, for example by terrestrial aerials, satellite communication, or cable communication. Typically, the signals from the central controller will be transmitted to the remote units using the same transmission medium as the display control signals and in the preferred arrangement the two sets of signals are combined together. For example, the signals from the central controller could be transmitted within a vertical blanking interval of a normal TV signal. In other approaches, different media could be used to transmit the two signals. The signals from the central controller may include signals which define data/graphics for display or the display device, often simultaneously with the display control signals, as well as control data for the remote unit.

BRIEF DESCRIPTION OF THE DRAWINGS

An example of an interactive communication system according to the invention will now be described with reference to the accompanying drawings, in which.

DETAILED DESCRIPTION OF THE EMBODIMENT

Figure 1:
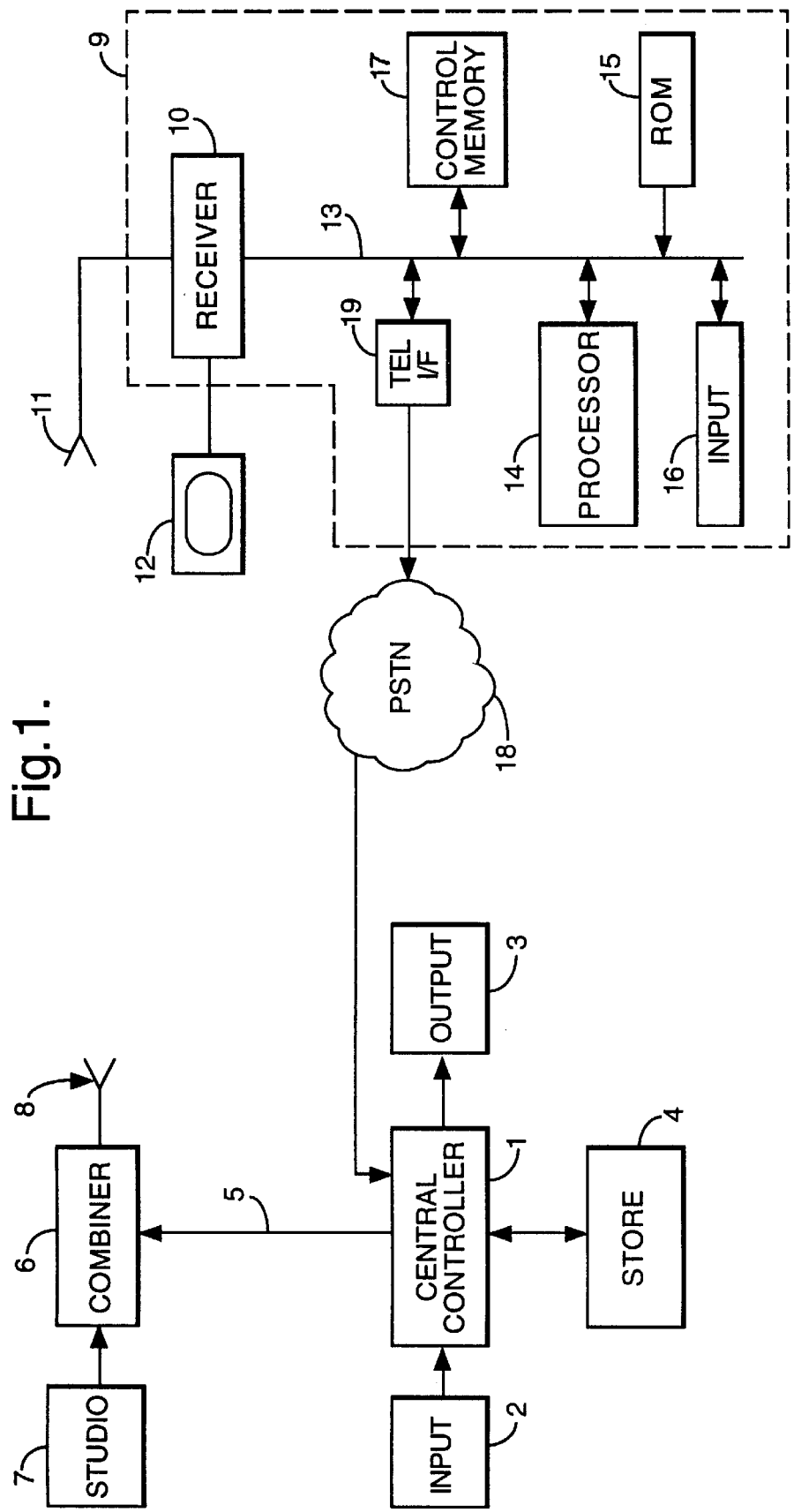
FIG. 1 is a schematic block diagram of the system.

The system shown in FIG. 1 comprises, at a central location, a central controller 1 which will include a computer, connected to an input device 2 such as a keyboard and/or mouse and the like and to an output device 3 which may include a monitor and/or printer. Data relating to service functions and remote users is contained in a store 4 which can be accessed and amended by the central controller 1. The central controller 1 generates data, which can be converted to TV display signals and other control signals associated with various service functions, on a land line 5 connected to a combining unit 6 defining an insertion point. The combining unit 6 receives television broadcast signals from a studio 7 (or outside broadcast) and combines these with the signals on the line 5, which it converts to TV signals or compatible data signals, so that they are transmitted simultaneously by a transmitter 8 to remote users of whom there may be many hundred. In other arrangements, the signals from the central controller 1 and the studio 7 are transmitted separately.

The signals supplied to the combiner 6 may be transmitted to the remote users within a vertical banking interval (VBI) of the normal TV signal or on a separate radio FM-SCA channel or other data format such as a cable modem.

Each remote user has a home or remote unit 9 having a television receiver 10 connected to an aerial 11 and a monitor 12. The home unit 9 includes an address/databus 13 connected to the receiver 10, the bus 13 being connected to a microprocessor 14, a memory 15, such as a ROM, storing programme instructions for the processor 14, one or more input devices 16 such as a keyboard or mouse, and a control memory (RAM) 17. Signals transmitted by the processor 14 can be communicated to the central controller 1 via a public switched telephone network (PSTN) 18 which is accessed by a telephone interface unit 19 connected to the bus 13.

The central controller 1 can be controlled by a central operator to provide a variety of service functions to the remote users. One example of such a service function is a game, typically associated with the TV broadcast. Conventionally, the central controller 1 can allow remote users to take part in simultaneously transmitted quiz shows and the like.

The invention allows further enhancements of such a system to be achieved. In this case, the control memory 17 is loaded with access control data, representing tokens which are obtained by the remote user on payment of money to the system operator. The payment transaction can be carried out manually or automatically following which the central controller 1 will transmit, as part of the signals fed along the line 5 to combiner 6, data specifically addressed to the home unit 9 which defines a number of tokens corresponding to those which have been purchased. Alternatively, this data could be sent to the remote unit via the PSTN 18 or another communication medium with which the remote unit can operate. This number is stored in the control memory 17 by the processor 14.

The tokens allow the remote user to gain access to certain restricted service functions or parts of service functions provided by the central controller 1. For example, a game may be offered by the central controller 1 for which there are value prizes, typically one or more additional tokens. To gain access to this game, when it is offered, the user indicates via the input device 16 to the processor 14 that he wishes to play the game and the processor 14 determines from information related to the game transmitted to it by the central controller 1 how many tokens are required. The processor 14 then determines from the control memory 17 whether or not there are sufficient tokens and if there are, allows signals transmitted to it relating to the game to be processed and displayed on the monitor 12 and, at the appropriate time, will transmit data relating to the user's performance through the PSTN 18 to the central controller 1. In addition, the processor 14 will adjust the data stored in the control memory 17 to reduce the number of tokens stored by the appropriate amount. Furthermore, the processor 14 may increment another stored value defining the number of tokens used, which can be transmitted later to the central controller 1 for audit purposes.

In the case of a horse race with fixed odds betting, the tokens are used as bets and the processor 14 will only enable access to the requested betting level if sufficient tokens are stored in the control memory 17. In this case, the TV signals fed to the combiner 6 may constitute a live transmission of the horse race allowing the user to bet on the outcome while watching the horse race.

Figure 2:
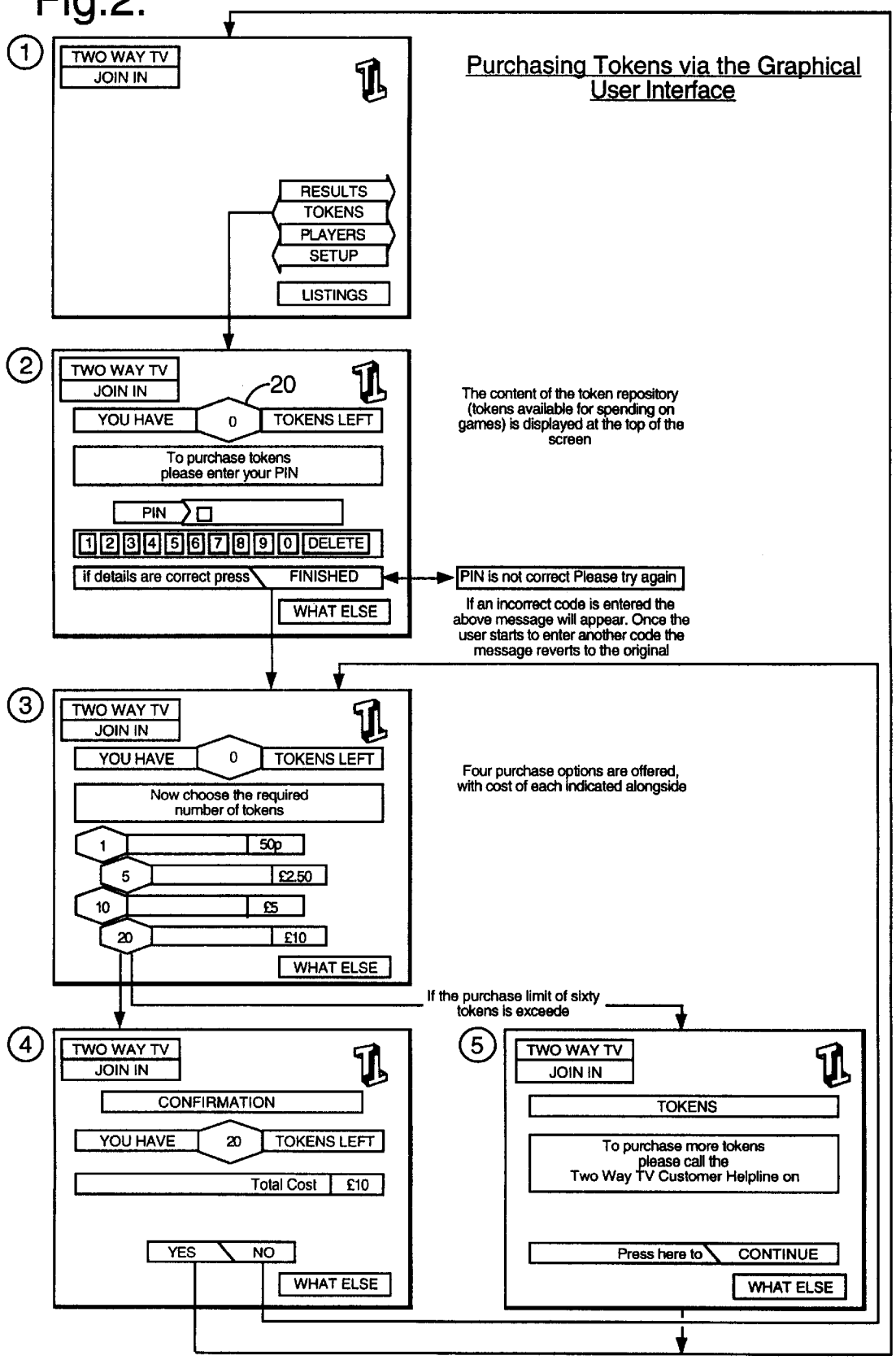
FIG. 2 illustrates an example of the screen displays produced when a user purchases tokens; and, FIG. 3 illustrates an example of the screen displays seen by a user when joining a tokens only game.

When the user wishes to increase the number of tokens in the control memory 17, this is done primarily by purchasing further tokens in a conventional manner. When purchased, the number of tokens in the memory 17 is incremented by the central controller 1. However, the present invention also enables the home unit 9 to increment the number of tokens independently of the central controller 1. FIG. 2 illustrates a series of screen displays which will appear on a monitor 12 under the control of a processor 14 during a request for further tokens. As shown in FIG. 2, Screen 1 has a series of icons, one of which is named Tokens. Using the input device 16 the user selects this icon and Screen 2 is displayed. This screen indicates at 20 the number of tokens available as defined by the content of the control memory 17. In this case, there are no tokens available. The user then has to enter a PIN via the input device 16 and this is checked by the processor 14 against a prestored PIN within the control memory 17. If the PIN is not correct then the message will be redisplayed to enter the PIN.

If the PIN is correct, Screen 3 is displayed which provides four purchase options for the user. In this example, one token costs 50p and the user can select 1, 5, 10 or 20 tokens. The user indicates the number via the input device 16. The processor 14 then sums the number of tokens defined as remaining in the control memory 17, those used since the last communication with the central controller, and those requested and compares this sum with a prestored credit limit, in this example 60 tokens. This credit limit is also stored in the control memory 17. If the proposed purchase will result in a total number of tokens not exceeding the credit limit then Screen 4 will be displayed indicating the number of tokens requested and requesting confirmation from the user that this is correct. Once confirmation has been given via the input device 16, the selected number (twenty in this case) will be summed with the remaining number in the control memory 17. The processor 14 will also update a purchase record defining the number of tokens purchased since the last communication with the central controller 1. If the credit limit is exceeded then Screen 5 is displayed and the content of the control memory 17 is unchanged.

The transaction which has been carried out will not be communicated immediately to the central controller 1. Instead, the processor 14 will wait until a connection needs to be made, for example during the playing of another game, or on receiving a specific request from the central controller 1, or if the total of transactions not forwarded to the central controller exceeds a threshold, or if no connection has been made for a predetermined time, and will then transmit to the central controller 1 via the PSTN 18 details of all the transactions since the last communication. This information is processed by the central controller 1 which will cause an appropriate invoice to be generated by the output device 3, which can be sent to the user for payment. At the same time, the central controller 1 will update the remote user's record in the store 4. The store 4 may also hold a larger credit limit than the home unit 9 and if the central controller 1 finds that this credit limit is being approached or even exceeded, suitable warnings can be sent to the output device 3 and at the same time the central controller 1 may prohibit that home unit from accessing further restricted service functions or processing further token requests.

FIG. 3 illustrates a set of screen displays which will be produced when a user wishes to access a game for which token payment is required. Initially, the central controller 1 will cause the processor 14 to produce a display on the monitor 12 (Screen 1) indicating that a tokens only game is available. If the user indicates via the input device 16 that he wishes to play that game, the processor 14, using information supplied from the central controller 1, will indicate on the screen the number of tokens required (Screen 2). If the user accepts the offer, a reconfirmation screen (Screen 3) is displayed and if this is confirmed, the game will be displayed and the processor 14 will allow inputs to be processed and stored and, if appropriate, transmitted later to the central controller 1 (Screen 4).

If following a request to play the game (Screen 2) the processor 14 determines that there are insufficient tokens in the control memory 17, Screen 5 will be displayed and the user can either abort at this point (Screen 9) or request further tokens (Screen 6) and the process described above in connection with FIG. 2 will then proceed. It will be seen that the Screens 7 and 8 in FIG. 3 correspond to Screens 3 and 4 in FIG. 2. Following purchase of sufficient tokens, the user can then request again to play the tokens only game.

Records of all transactions are stored by the home unit until the memory space allocated is full, after which each new addition results in the deletion of the oldest record. Typically, every time the home unit calls the central system, it logs details of all its stored token transaction records.

In the preferred example the data stored by the home unit includes: tokens it has issued, tokens it has requested from the central controller, tokens it has been granted by the central controller, free tokens it has been granted, tokens it has issued as prizes, also tokens it has spent and what it spent them on.

In some cases, the service provider may wish to grant free Tokens to customers for promotional purposes. This can be done manually, either to individuals or to groups of subscribers, sending a record to the Home Unit(s) that they were free and noting this in the database 4, together with a reason why they were granted. Free Tokens issued by the home unit are not subject to the Home Unit local credit limit.

In prize games it is convenient to grant tokens as prizes and the most efficient way to do this is to instruct the Home Unit to do it itself.

In the case of a prize game, a conventional scoring algorithm can be used to determine the points thresholds which offer prizes. The central controller 1 will then send this threshold information over the air and any home units which contain matching scores will display a prize symbol in the results screen for that game.

Home Units that qualify for any prize other than Tokens will call in to confirm their qualification and this will be handled at the central controller. If the subscriber has won tokens, the Home Unit will automatically issue them on the spot (by suitably incrementing the token count in the control memory 17), telling the central controller 1 it has done so on the next occasion it phones in.

Settling bets will be a similar process. The central controller will send out messages confirming results of the betting event and Home Units with matching bets will pay out, informing the central controller later. This will allow punters to bet with their winnings.

Prize Tokens and Winnings Tokens issued by the Home Unit are not controlled by the Home Unit credit limit.

We claim:

1. An interactive communication system, the system comprising a central controller, and at least one remote unit adapted to be connected to a display device, said central controller generating signals in accordance with a service function, access to all or part of which is restricted, the signals being supplied to said at least one remote unit for display on the display device, wherein said at least one remote unit includes a processor, responsive to signals from said central controller, and being selectively connectable to said central controller to transmit information back to the central controller, said at least one remote unit further comprising an input device and a control memory connected to said processor, said input device allowing a user to enter information, and said control memory storing access control data, the processor being responsive to the access control data to allow a user to gain access to the restricted part of the service function, and periodically supplying data to said central controller related to said access, wherein said central controller can generate signals which are supplied to said at least one remote unit to modify the access control data, and wherein said processor is adapted to modify the access control data in the control memory independently of said central controller to allow additional access.

2. A system according to claim 1, wherein said control memory contains data defining a limit to which the processor can modify the access control data in the control memory to allow additional access in response to a user request.

3. A system according to claim 1, wherein said processor is adapted to modify the access control data in dependence upon the user's response to signals from the central controller.

4. A system according to claim 3, wherein the said signals relate to the same or a different service function.

5. A system according to claim 1, wherein said processor is adapted to modify the access control data in response to a request from a user via the input device.

6. A system according to claim 1, wherein said processor is adapted to communicate information to said central controller concerning modifications made by said processor to the access control data to allow additional access, on the next occasion when other data is communicated to said central controller.

7. A system according to claim 1, wherein said processor is adapted to connect to said central controller to pass information relating to past access to the restricted part of at least one service function when more than a predetermined amount of such use has occurred.

8. A system according to claim 1, wherein the access control data comprises a count defining a number of allowed accesses to the restricted part of the service function.

9. A system according to claim 8, wherein said processor is adapted to decrement the count upon each access.

10. A system according to claim 1, wherein the access control data further comprises information defining the service function to which access is to be allowed.

11. A system according to claim 1, wherein said processor responds to the access control data to allow access to more than one restricted access service function.

12. A system according to claim 1 for use in conjunction with transmitted, display control signals, wherein each remote unit is adapted to receive the display control signals and provide a corresponding visual display.

13. A system according to claim 12, wherein the display control signals comprise TV broadcast signals, said at least one unit including a receiver which receives the TV broadcast signals and controls the display device accordingly.

14. A system according to claim 1, further comprising means for combining and transmitting the display control signals and the signals from said central controller.

15. A system according to claim 1, wherein the service function is a game.

16. A remote unit for use in an interactive communication system, the remote unit being connected in use to a display device and including a processor, responsive to the signals from a central controller defining one or more service functions, access to or all or a part of which is restricted, to generate displays on the display device and being selectively connectable to the central controller to transmit information back to the central controller, the remote unit further comprising an input device and a control memory connected to the processor, the input device allowing a user to enter information, wherein the control memory stores access control data, the processor being responsive to the access control data to allow a user to gain access to the restricted part of the service function, and periodically supplying data to the central controller related to said access and wherein the processor is adapted to modify the access control data in the control memory independently of said central controller to allow additional access.

17. A unit according to claim 16, wherein the control memory contains data defining a limit to which the processor can modify the access control data in the control memory to allow additional access in response to a user request.

18. A unit according to claim 16, wherein said processor is adapted to modify the access control data in dependence upon the user's response to signals from the central controller.

19. A unit according to claim 18, wherein the said signals relate to the same or a different service function.

20. A unit according to claim 16, wherein said processor is adapted to modify the access control data in response to a request from a user via the input device.

21. A unit according to claim 16, wherein said processor is adapted to communicate information to the central controller concerning modifications made by the processor to the access control data to allow additional access, on the next occasion when other data is communicated to the central controller.

22. A unit according to claim 16, wherein said processor is adapted to connect to the central controller to pass information relating to past access to the restricted part of one or more service functions when more than a predetermined amount of such use has occurred.

23. A unit according to claim 16, wherein the access control data comprises a count defining a number of allowed accesses to the restricted part of the service function.

24. A unit according to claim 23, wherein said processor is adapted to decrement the count upon each access.

25. A unit according to claim 16, wherein the access control data further comprises information defining the service function to which access is to be allowed.

26. A unit according to claim 16, wherein the processor responds to the access control data to allow access to more than one restricted access service function.

* * * * *